United States Patent [19]

Kamata et al.

[11] Patent Number: 5,119,252
[45] Date of Patent: Jun. 2, 1992

[54] INHIBITING EJECTION OF DISC MEMORY FOR SELECTED TIME AFTER POWER OFF

[75] Inventors: Hiroshi Kamata, Machida; Tetsuo Kanno, Ebina; Yuji Nakajima, Hadano, all of Japan

[73] Assignee: Ricoh Company, Ltd., Tokyo, Japan

[21] Appl. No.: 533,368

[22] Filed: Jun. 5, 1990

[30] Foreign Application Priority Data

Jun. 12, 1989 [JP] Japan ................. 1-146801

[51] Int. Cl.⁵ ............................ G11B 17/04
[52] U.S. Cl. ................. 360/99.06; 360/99.07; 360/97.01; 360/71
[58] Field of Search ........... 360/99.07, 98.05, 98.04, 360/99.06, 99.02, 97.01, 69, 71

[56] References Cited

U.S. PATENT DOCUMENTS

| | | | |
|---|---|---|---|
| 4,352,132 | 9/1982 | Gyi | 360/99.07 |
| 4,573,092 | 2/1986 | Sugiyama et al. | 360/99.06 |
| 4,573,093 | 2/1986 | Obama et al. | 360/99.06 |
| 4,620,249 | 10/1986 | Suzaki et al. | 360/99.02 |
| 4,724,497 | 2/1988 | Takeda et al. | 360/99.06 |
| 4,729,051 | 3/1988 | Huttever et al. | 360/71 |
| 4,736,263 | 4/1988 | Takahashi et al. | 360/99.02 |
| 4,816,945 | 3/1989 | Watanabe | 360/99.07 |
| 4,829,393 | 5/1989 | Shimizu et al. | 360/99.07 |

FOREIGN PATENT DOCUMENTS 57-210477 12/1982 Japan ................. 360/99.02
89/8306  9/1989 PCT Int'l Appl. ......... 360/99.07

Primary Examiner—Robert S. Tupper
Assistant Examiner—Alfonso Garcia
Attorney, Agent, or Firm—Copper & Dunham

[57] ABSTRACT

An ejection inhibiting mechanism in a disk memory device of a meidum exchanging type has a latching solenoid for inhibiting the operation of an ejecting mechanism for ejecting a memory medium; an inhibit releasing device for releasing the inhibition of the operation of the ejecting mechanism by the operation of the latching solenoid when a predetermined time has passed after power of the disk memory device is stopped; and a storage battery charged at any time and supplying power to the latching solenoid and the inhibit releasing device. The operation of the ejecting mechanism is inhibited until the rotation of the memory medium is stopped. A cartridge for a disk constructing the memory medium is ejected after the power of the disk memory device is turned off and the rotation of the disk is completely stopped. An attractive state of the latching solenoid is released when the predetermined time has passed.

3 Claims, 6 Drawing Sheets

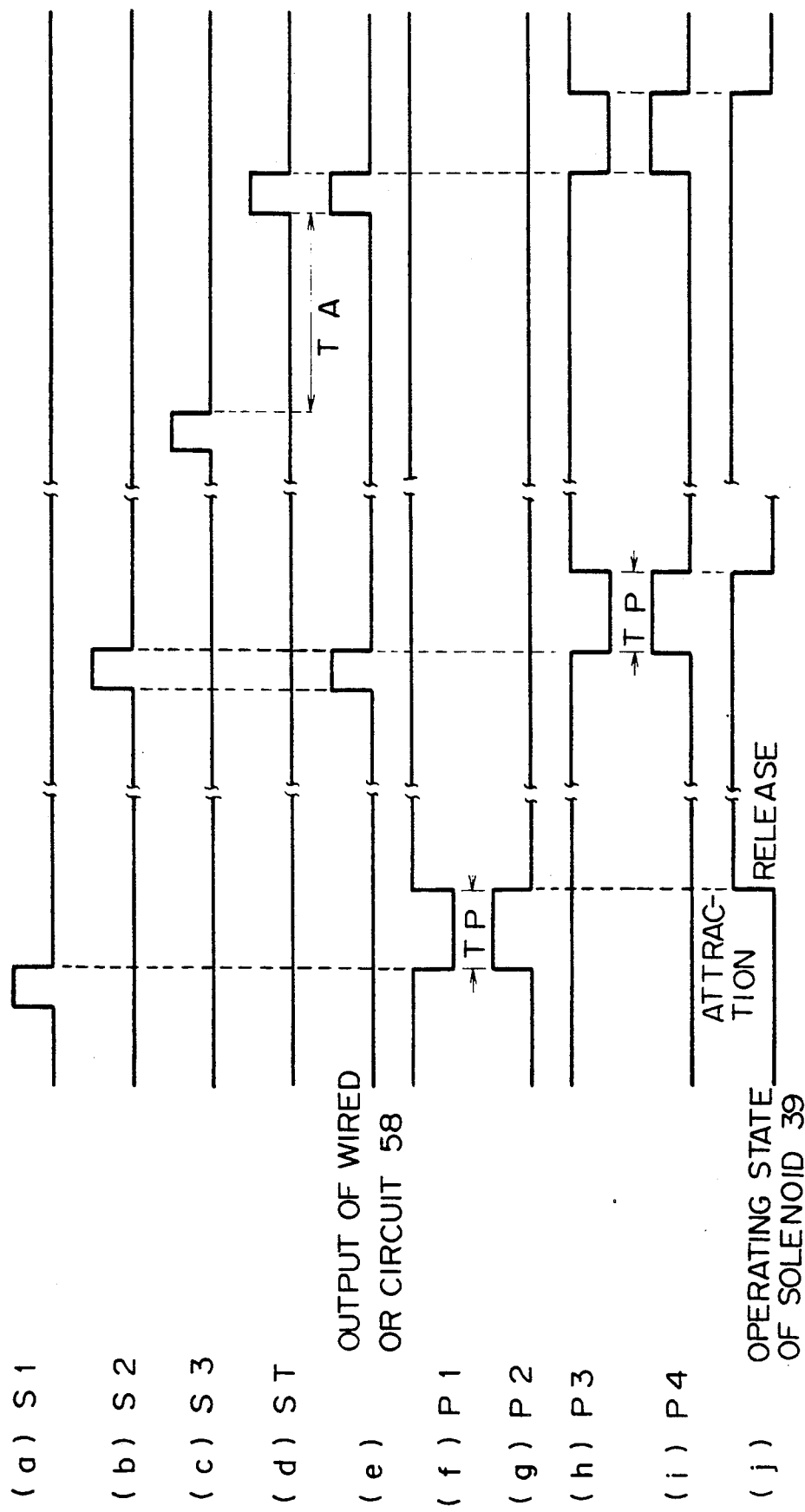

INHIBITING EJECTION OF DISC MEMORY FOR SELECTED TIME AFTER POWER OFF

BACKGROUND OF THE INVENTION

1. Field of the Invention

The present invention relates to an ejection inhibiting mechanism in a disk memory device of a medium exchanging type.

2. Description of the Related Art

For example, a disk cartridge for housing a magnetic disk therein is disposed in a magnetic disk device of a medium exchanging type. In this device, a mechanism for ejecting the disk cartridge is not operated when the magnetic disk is accessed, or while the rotation of the magnetic disk is completely stopped after a power of the device is turned off.

Such a general device has the following problems.

Namely, when the power of the magnetic disk device is turned off, a solenoid having a plunger for controlling the operation of an ejecting button is immediately turned off so that it is possible to push-in the ejecting button. However, it takes a time about ten seconds until the rotation of the magnetic disk rotating at a high speed is completely stopped.

Accordingly, when the ejecting button is pushed-in immediately after the power is turned off by an operator. The operation for ejecting the magnetic disk is performed in a state in which the rotation of the magnetic disk is not completely stopped. Therefore, there are problems that a recording face of the magnetic disk is damaged and a magnetic head for recording and reproducing data onto the magnetic disk is damaged.

SUMMARY OF THE INVENTION

It is therefore an object of the present invention to provide an ejection inhibiting mechanism for safely ejecting a recording medium.

The above object of the present invention can be achieved by an ejection inhibiting mechanism in a disk memory device of a medium exchanging type, comprising a latching solenoid for inhibiting the operation of an ejecting mechanism for ejecting a memory medium; inhibit releasing means for releasing the inhibition of the operation of the ejecting mechanism by the operation of the latching solenoid when a predetermined time has passed after power of the disk memory device is stopped; and a storage battery charged at any time and supplying power to the latching solenoid and the inhibit releasing means.

Accordingly, power is supplied by the storage battery to the latching solenoid and the inhibit releasing means even when the power of the disk device is stopped. Thus, it is possible to inhibit the operation of the ejecting mechanism until the rotation of the memory medium is stopped so that it is possible to prevent the memory medium and a recording/reproducing head from being damaged.

Further objects and advantages of the present invention will be apparent from the following description of the preferred embodiments of the present invention as illustrated in the accompanying drawings.

BRIEF DESCRIPTION OF THE DRAWINGS

FIG. 7 is a view of signal waveforms for explaining the operation of the driving circuit in FIG. 6.

DESCRIPTION OF THE PREFERRED EMBODIMENTS

The preferred embodiments of an ejection inhibiting mechanism in the present invention will next be described in detail with reference to the accompanying drawings.

Figure 1A:
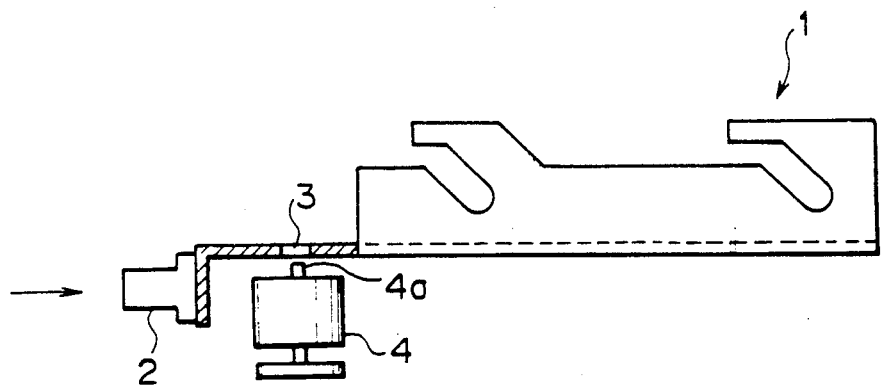
FIGS. 1a and 1b are schematic views showing an example of a general ejection inhibiting mechanism.
Figure 1B:
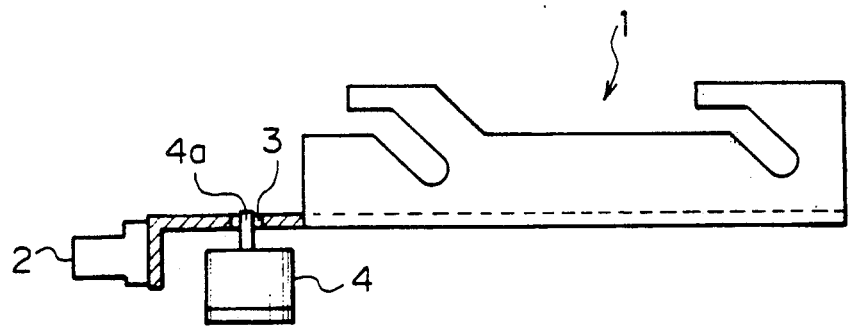

FIGS. 1a and 1b show an example of a general ejection inhibiting mechanism.

In these figures, a disk loading mechanism 1 is disposed to attach and detach an unillustrated disk cartridge from an unillustrated driving section thereof. An ejecting button 2 for ejecting the attached disk cartridge is disposed in the disk loading mechanism 1.

The disk cartridge attached to the loading mechanism 1 can be ejected by pushing-in this ejecting button 2 and moving the loading mechanism 1 backwards, An engaging hole 3 is disposed in a connecting portion between the ejection button 2 and the loading mechanism 1. A solenoid 4 is disposed just below this engaging hole 3. The pushing operation of the ejecting button 2 is inhibited by inserting a plunger 4a of the solenoid 4 into the engaging hole 3.

Namely, when this solenoid 4 is turned off, the plunger 4a is not inserted into the engaging hole 3 as shown in FIG. 1a. Therefore, it is possible to push-in the ejecting button 2 so that the disk cartridge attached onto the loading mechanism 1 can be ejected.

When the solenoid 4 is turned on, the plunger 4a, inserted into the engaging hole 3 as shown in FIG. 1b so that the ejecting button 2 cannot be pushed in and the disk cartridge attached onto the loading mechanism 1 cannot be ejected.

However, such a general device has the following problems.

Namely, when the power of the magnetic disk device is turned off, the solenoid 4 is immediately turned off so that it is possible to push-in the ejecting button 2. However, it takes a time about ten seconds until the rotation of the magnetic disk rotating at a high speed is completely stopped.

Accordingly, when the ejecting button 2 is pushed-in immediately after the power is turned off by an operator. The operation for ejecting the magnetic disk is performed in a state in which the rotation of the magnetic disk is not completely stopped. Therefore, there are problems that a recording face of the magnetic disk is damaged and a magnetic head for recording and reproducing data onto the magnetic disk is damaged.

Figure 2:
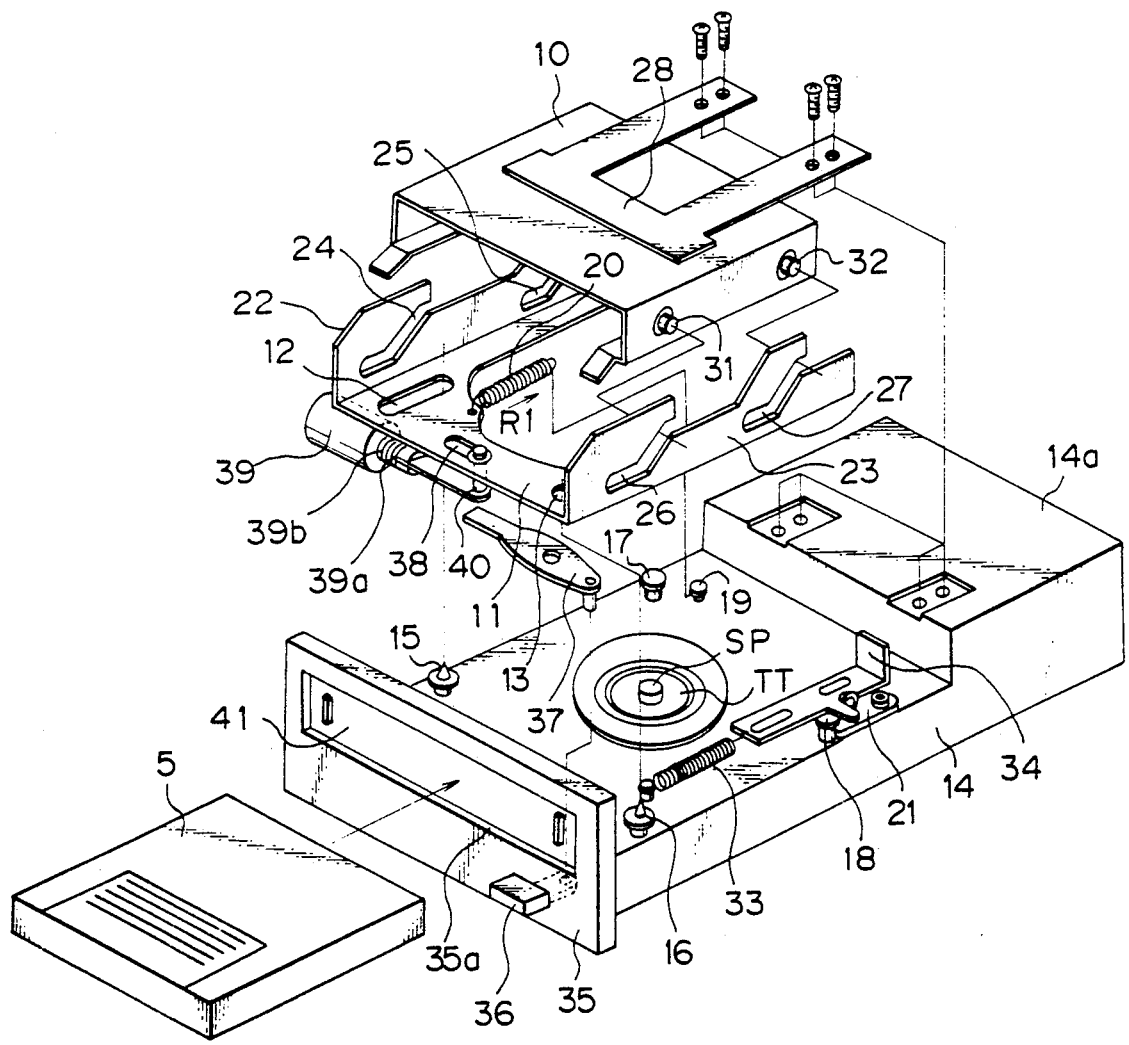
FIG. 2 is an exploded perspective view showing the schematic construction of an ejection inhibiting mechanism in a magnetic disk device in one embodiment of the present invention.

FIG. 2 shows a loading mechanism constituting an ejection inhibiting mechanism in a magnetic disk device in one embodiment of the present invention.

This loading mechanism is mainly composed of a receiver 10 for holding a disk cartridge 5 and a carrier 11 for moving this receiver 10 in the vertical direction.

In the carrier 11, reference pins 15 and 16 are disposed in a frame 14 of the magnetic disk device to set a reference position of the disk cartridge 5 and are respectively inserted into elongated holes 12 and 13 disposed at both front ends of the carrier 11.

Height reference pins 17 and 18 for setting the height of the carrier 11 are disposed in rear positions of the frame 14 backward from the reference pins 15 and 16. These height reference pins 17 and 18 are inserted into unillustrated elongated holes disposed in the carrier 11. Thus, the movement of the carrier 11 is limited to only the longitudinal direction of the elongated holes 12 and 13.

A spring 20 is disposed between the carrier 11 and a pin 19 disposed in the vicinity of the height reference pin 17 of the frame 14. Thus, a biasing force is applied to the carrier 11 in the direction of arrow R1, i.e., in the direction in which the disk cartridge is inserted. When no disk cartridge is mounted onto the disk device. This biasing force is not applied to the carrier 11 by the engagement of the carrier 11 and a carrier latch mechanism 21 disposed in a rear position of the height reference pin 18 of the frame 14.

Guide holes 24, 25 and 26. 27 for guiding the receiver 10 have an approximately V-shape and are respectively formed in rising side end portions 22 and 23 of the carrier 11.

The receiver 10 is formed such that the disk cartridge is approximately surrounded by the receiver 10 from above and both sides thereof. Both lower side portions of a port for housing the disk cartridge are bent downwards.

A support member 28 for supporting the receiver 10 in the frame 14 is attached onto an upper face of the receiver 10. Pins 29 to 32 (pins 29 and 30 are not shown in FIG. 2) are disposed in both side portions of the receiver 10 and are engaged with the guide holes 24 to 26 formed in the side end portions 22 and 23 of the carrier 10. Thus, the direction of the movement of the receiver 10 is restricted to only the vertical direction.

An ejecting plate 34 is disposed in the vicinity of the carrier latch mechanism 21 in the frame 14 and is biased by the spring 33 in an ejecting direction of the disk cartridge. When no disk cartridge is mounted onto the disk device, the ejecting plate 34 is not engaged with the carrier latch mechanism 21 so that the ejecting plate 34 is moved in the biasing direction of the spring 33. When the disk cartridge is mounted onto the disk device, the ejecting plate 34 is engaged with the carrier latch mechanism 21 so that no biasing force of the spring 33 is applied to the ejecting plate 34.

An ejecting button 36 is disposed such that this ejecting button is projected from a front panel 35. The ejecting button 36 is connected to one end of an ejecting lever 37. The other end of the ejecting lever 37 is arranged such that this ejecting lever 37 can be engaged with an ejecting pin 40. This ejecting pin 40 is inserted at one end thereof to an elongated hole 38 disposed in a front end portion of the carrier 11 and is attached at the other end thereof to a plunger 39a of a latching solenoid 39. A coil spring 39b is disposed in the plunger 39a of the latching solenoid 39 to project and bias the plunger 39a and in a direction in which the plunger 39a is released from the solenoid.

A door 41 is disposed to close a window 35a for inserting the disk cartridge 5. A mechanical section such as a magnetic disk head mechanism is housed in a rear portion 14a of the frame 14. A spindle motor SP and a turntable TT for rotating an unillustrated magnetic disk housed in the disk cartridge 5 are disposed in suitable positions of the frame 14.

In the above-mentioned structure, when no disk cartridge 5 is mounted onto the disk device, the carrier 11 is latched to the carrier latch mechanism 21 in a state in which the carrier 11 is moved in the ejecting direction of the disk cartridge. The spring 20 is in an extended state and no biasing force thereof is applied to the carrier 11. At this time, the ejecting plate 34 is move in the above ejecting direction.

Figure 3A:
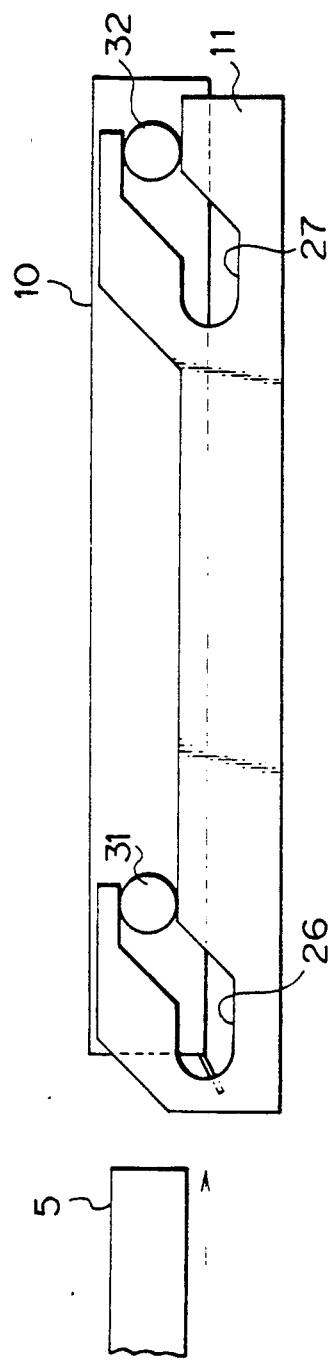
FIG. 3a is a schematic side view showing an operating state of the ejection inhibiting mechanism before a disk cartridge is mounted onto the magnetic disk device.
Figure 3B:
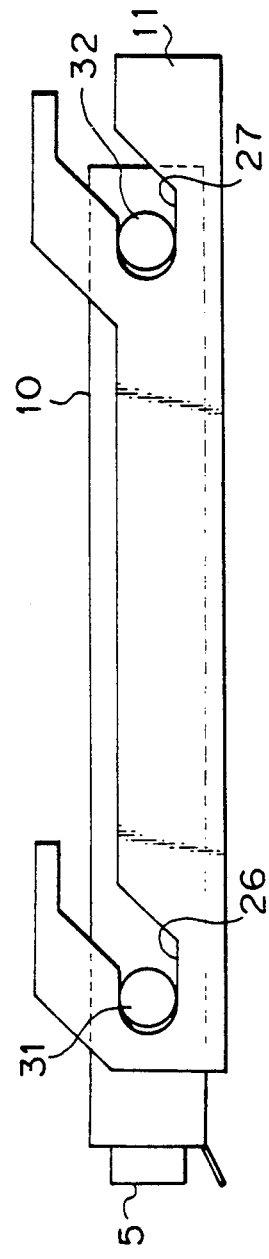
FIG. 3b is a schematic side view showing an operating state of the ejection inhibiting mechanism in which the disk cartridge is completely mounted onto the magnetic disk device.

In this state, when the door 41 is opened and the disk cartridge 5 is inserted into the receiver 10 to a certain extent as shown in FIG. 3a, the disk cartridge 5 hits against the ejecting plate 34 and the ejecting plate 34 is moved backwards against the biasing force of the spring 33 as the disk cartridge 5 is inserted into the receiver 10.

In a position slightly before the disk cartridge 5 is inserted into the receiver 10 until a limit position thereof, the ejecting plate 34 releases the engagement between the carrier 11 and the carrier latch mechanism 21. Thus, the carrier 11 is moved in the inserting direction of the disk cartridge by the biasing force of the spring 20 and the pins 29 to 32 of the receiver 10 are moved long the guide holes 24 to 27 of the carrier 11, thereby lowering the receiver 10 as shown in FIG. 3a.

Thus, while the reference pins 15 and 16 are inserted into unillustrated reference holes of the disk cartridge 5 and the disk cartridge 5 is positioned in a reference position thereof, the disk cartridge 5 is lowered toward the turntable TT and the magnetic disk is joined to the turntable TT, thereby completing a disk chucking operation.

Thereafter, the magnetic disk can be suitably accessed.

When the ejecting button 36 is pushed-in to eject the disk cartridge 5, and end portion of the ejecting lever 37 engaged with the ejecting pin 40 is moved in the ejecting direction of the disk cartridge.

Figure 4A:
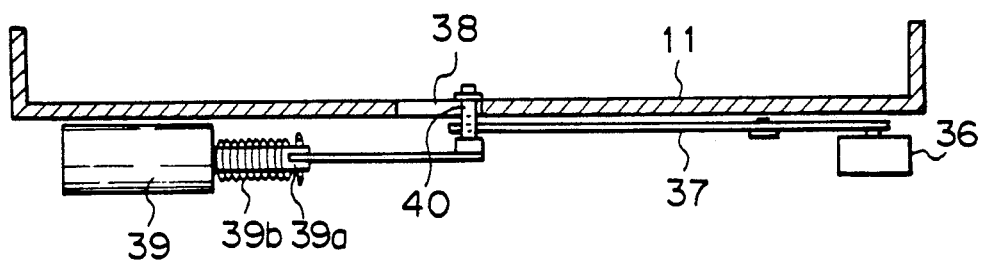
FIG. 4a is a schematic cross-sectional view showing an ejectable state of the ejection inhibiting mechanism.

At this time, as shown in FIG. 4a, the latching solenoid 39 is in a released state and the plunger 39a thereof is projected. Accordingly, when the ejecting pin 40 can be engaged with the ejecting lever 37, force of the ejecting lever 37 is transmitted to the ejecting pin 40 so that the ejecting pin 40 is moved in the ejecting direction of the disk cartridge and the carrier 11 is moved against the biasing force of the spring 20 in the ejecting direction of the disk cartridge.

Thus, the receiver 10 is gradually raised and is moved in the above ejecting direction. At this time, the chucking operation between the turntable TT and the magnetic disk is released.

At a timing when the pushing-in position of the ejecting botton 36 has approximately reached a limit position thereof, the carrier latch mechanism 21 and the ejecting plate 34 are disengaged from each other and the ejecting plate 34 is moved by the biasing force of the spring 33 in the ejecting direction of the disk cartridge.

Thus, the disk carriage 5 is pressed by the ejecting plate 34 so that the disk cartridge 5 is ejected from the window 35a.

The carrier 11 is latched by the carrier latch mechanism 21 after the ejecting plate 34 and the carrier latch mechanism 21 are disengaged from each other.

Thus, the disk cartridge 5 is attached and detached by the operation of the above loading mechanism from the magnetic disk drive unit.

Figure 4B:
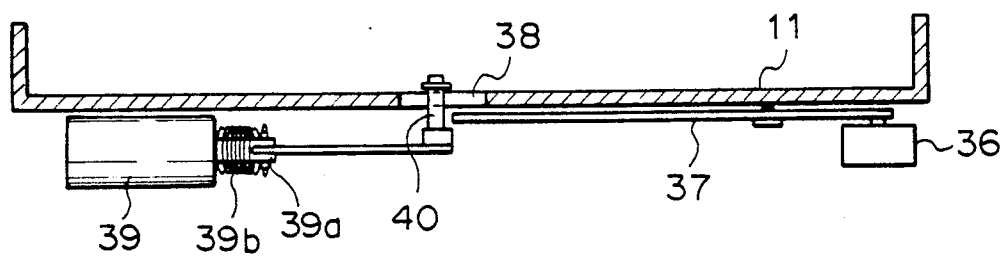
FIG. 4b is a schematic cross-sectional view showing an ejection inhibiting state of the ejection inhibiting mechanism.

When the latching solenoid 39 is in a state in which this solenoid attacts the plunger 39a as shown in FIG. 4b, the ejecting pin 40 is moved to a position in which this ejecting pin is not engaged with the ejecting lever 37. Accordingly, no force of the ejecting lever 37 is transmitted to the ejecting pin 40 even when the ejecting button 36 is pushed-in. Therefore, no ejecting operation of the disk cartridge 5 is performed.

Namely, it is possible to inhibit the ejecting operation by setting the operating state of the latching solenoid 39 to the above attractive state. Further, it is possible to release the inhibition of the ejecting operation by releasing the attractive state of the latching solenoid 39 (which is simply called a releasing state in the following description).

Here, the operation of the latching solenoid 39 will next be described.

Figure 5:
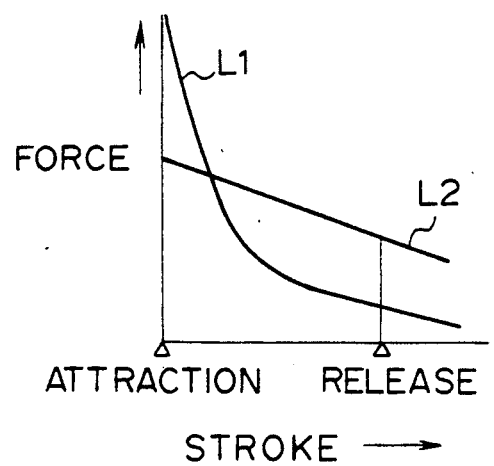
FIG. 5 is a graph for explaining the operation of a latching solenoid.

The magnetic attractive force applied to the plunger 39a by a magnetic circuit formed by the latching solenoid 39 and the biasing force in the above releasing direction provided by the coil spring 39b disposed in the plunger 39a are respectively changed in accordance with a stroke of the plunger 39a as shown by curves L1 and L2 in FIG 5.

Accordingly, when a driving electric current in the above attractive direction is applied to the latching solenoid 39 for a sufficient period and the plunger 39a is moved in this attractive direction, the magnetic attractive force of the magnetic circuit is stronger than the biasing force of the coil spring 39b with respect to this stroke. Therefore, when the supply of the driving electric current to the latching solenoid 39 is stopped, the latching solenoid 39 is held in a state in which the plunger 39a is moved in the above attractive direction.

On the other hand, when the driving electric current in the above releasing direction is applied to the latching solenoid 39 for a sufficient period and the plunger 39a is moved in this releasing direction, the biasing force of the coil spring 39b is stronger than the magnetic attractive force of the magnetic circuit with respect to this stroke. Therefore, when the supply of the driving electric current to the latching solenoid 39 is stopped, the latching solenoid 39 is held in a state in which the plunger 39a is moved in the above releasing direction.

Thus, the latching solenoid 39 holds the plunger in either the attractive or releasing direction in a state in which no driving electric current is applied to the latching solenoid 39.

Accordingly, when an ejection inhibiting state is set, it is sufficient to apply the driving electric current in the attractive direction to the latching solenoid 39 for a constant period. When an ejectable state is set, it is sufficient to apply the driving electric current in the releasing direction to the latching solenoid 39 for a constant period.

Figure 6:
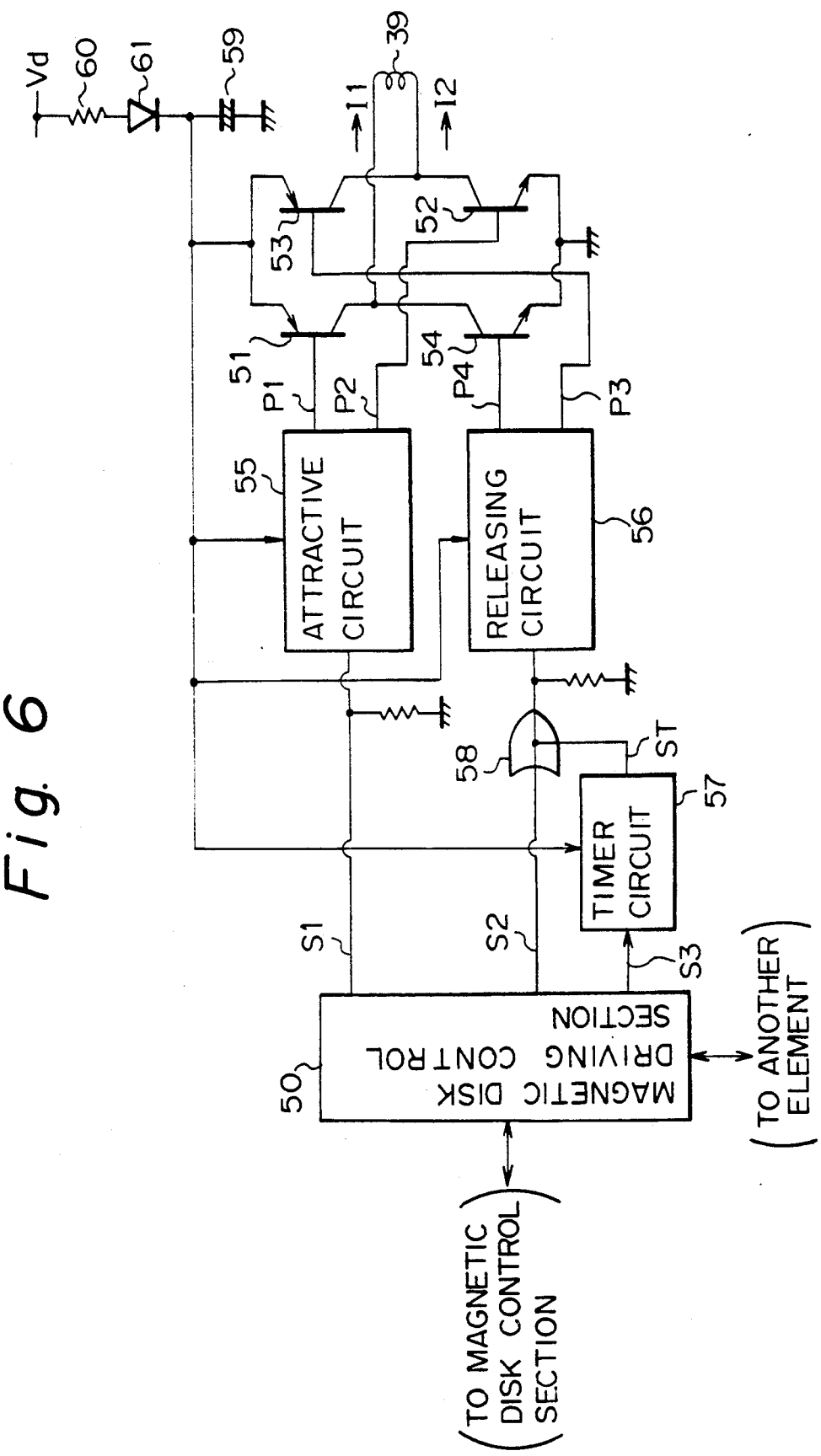
FIG. 6 is a circuit diagram showing one example of a driving circuit for operating the latching solenoid.

FIG. 6 shows a driving control section of the latching solenoid 39.

In this figure, a magnetic disk driving control section 50 includes a section for controlling the operation of the latching solenoid 39. This control section 50 is a section for controlling the operation of a magnetic disk driving section such as a spindle motor, a magnetic head, a head access mechanism, etc. This control section 50 receives and transmits various kinds of information to a magnetic disk control section for controlling the operation of the magnetic disk device.

Transistors 51 and 52 are disposed to apply a driving electric current I1 in the attractive direction to the latching solenoid 39. Transistors 53 and 54 are disposed to apply a driving electric current I2 the releasing direction to the latching solenoid 39.

When an attractive signal S1 is outputted from the magnetic disk driving control section 50, an attractive circuit 585 outputs turning-on signals P1 and P2 for turning on the transistor 51 and 52 and having a constant pulse width.

When a releasing signal S2 is outputted from the magnetic disk driving control section 50, a releasing circuit 56 outputs turning-on signals P3 and P4 for turning on the transistors 53 and 54 and having a constant pulse width.

A timer circuit 57 is triggered when a power off signal S3 is outputted from the magnetic dissk driving control section 50. This timer circuit 57 outputs a releasing timer signal ST when a time TA slightly longer than a coasting time of the magnetic disk has passed. This releasing timer signal ST is transmitted to a wired OR circuit 58 to perform a wired OR operation with respect to this releasing timer signal ST and the releasing signal S2 and is then added to the releasing circuit 56.

Accordingly, the releasing circuit 56 is operated when the releasing signal S2 is outputted from the magnetic disk driving control section 50 and the timer releasing signal ST is outputted from the timer circuit 57.

A capacitor 59 is disposed to supply power to the transistors 51 and 54 for applying the driving electric current to the latching solenoid 39, the attractive circuit 55, the releasing circuit 56 and the timer circuit 57. A power voltage Vd is applied to the capacitor 59 through a series circuit composed of a resistor 60 and a diode 61 at any time so as to charge this capacitor.

In the above-mentioned structure, when the disk cartridge 5 is mounted onto the magnetic disk device as mentioned above, the magnetic disk driving control section 50 detects this cartridge by an unillustrated sensor, thereby infoming the magnetic disk control section that the disk cartridge 5 is mounted onto the disk device. Further, the attractive signal S1 is outputted as shown in FIG. 7a to inhibit the ejecting operation. The rotation of the spindle motor SP is started to rotate the magnetic disk and a magnetic head access mechanism is moved to a standby position.

Thus, the magnetic disk control section informs an unillustrated host apparatus using this magnetic disk device that the disk cartridge 5 is mounted onto this disk device. Thus, the magnetic disk control section attains an access standby state.

The attractive circuit 55 outputs the turning-on signals P1 and P2 having a pulse width TP as shown in the items (f) and (g) of FIG. 7 when this attractive circuit 55 inputs the attractive signal S1 so that the transistors 51 and 52 are turned on for a period provided by this pulse width TP.

Thus, the driving electric current I1 is applied to the latching solenoid 39 for the period provided by the pulse width TP so that the latching solenoid 39 is moved in the attractive direction as shown by item (j) of FIG. 7. The attractive state of the latching solenoid 39 is held even when no turning-on signals P1 and P2 are outputted and the supply of the driving electric current I1 to the latching solenoid is stopped.

Accordingly, when the disk cartridge 5 is mounted onto the magnetic disk device and the magnetic disk is in the accessible state, the latching solenoid 39 attains the attractive state os that the ejecting operation of the disk cartridge 5 is inhibited as mentioned above.

When an ejecting command of the magnetic disk is provided from the host apparatus from the above inhibiting state as in a case in which used magnetic disks are exchanged for each other, the magnetic disk control section informs the magnetic disk driving control section 50 that the ejecting command is provided.

Thus, the magnetic head is escaped by the operation of the magnetic disk driving control section 50 from a predetermined position thereof. Further, the magnetic disk driving control section 50 stops the rotation of the spindle motor SP and outputs the releasing signal S2 to release the ejection inhibiting state at a timing for completely stopping the rotation of the magnetic disk as shown in item (b) of FIG. 7.

This releasing signal S2 is inputted to the releasing circuit 56 through the wired OR circuit 58 as shown in item (e) of FIG. 7. Thus, the releasing circuit 56 outputs the turning-on signals P3 and P4 having the pulse width TP as shown in items (h) and (i) of FIG. 7 so as to turn on the transistors 53 and 54 for the period provided by the pulse width TP.

Thus, the driving electric current I2 is applied to the latching solenoid 39 for the period provided by the pulse width TP so that the latching solenoid 39 is moved in the releasing direction. The releasing state of the latching solenoid 39 is held even when no turning-on signals P3 and P4 are outputted and the supply of the driving electric current I2 to the latching solenoid is stopped.

Accordingly, in this case, since the latching solenoid 39 is in the releasing state, it is possible to eject the disk cartridge 5 as mentioned above.

Therefore, an operator can eject the mounted disk cartridge 5 by pushing-in the ejecting button 36 and mount a new disk cartridge 5 onto the disk device.

For example, when the power of the magnetic disk device is turned off in a state in which the disk cartridge 5 is mounted onto the disk device by the operator, this power interruption is informed by a power monitoring circuit to the magnetic disk driving control section 50. Thus, the magnetic disk driving control section 50 outputs a power off signal S3 for a period in which this control section can be operated as shown in item (c) of FIG. 7.

This power off signal S3 is inputted to the timer circuit 57 so that the timer circuit 57 outputs the timer releasing signal ST at a timing when a constant time TA has passed as shown in item (d) of FIG. 7.

This timer releasing signal ST is inputted to the releasing circuit 56 through the wired OR circuit 58 so that, similar to the above operation, the releasing circuit 56 outputs the turning-on signals P3 and P4 having the pulse width TP.

As a result, similar to the above-mentioned operation, the latching solenoid 39 is moved in the releasing direction so that the disk cartridge 5 is in the ejectable state.

The transistors 53, 54, the releasing circuit 56 and the timer circuit 57 are operated by the power supplied from the capacitor 59 for a period from the turning-off operation of the power to the completion of the releasing state of the latching solenoid 39.

Accordingly, when the power of the magnetic disk device is turned off, no power is supplied to the spindle motor SP so that the rotation of the magnetic disk is gradually stopped. The latching solenoid 39 is operated in the attractive state and therefore the ejecting operation is inhibited for the time period TA slightly longer than the time until the rotation of the magnetic disk is completely stopped.

When the time TA has passed after the power is turned off, the latching solenoid 39 attains the releasing state as mentioned above so that it is possible to perform the ejecting operation.

Namely, the ejecting operation of the disk cartridge 5 is inhibited for the period from the turning-off operation of the power to the complete stoppage of the rotation of the magnetic disk. The ejecting operation of the disk cartridge 5 can be performed after the rotation of the magnetic disk is completely stopped. Therefore, it is possible to prevent the magnetic disk and the magnetic head from being damaged.

The inhibition of the ejecting operation and the release thereof are performed by using the latching solenoid 39, thereby reducing power consumption required therefor. Accordingly, it is possible to construct the power supplied to a circuit for inhibiting the ejecting operation and releasing this inhibition by the capacitor 59.

In the above-mentioned embodiment, the power off signal indicating that the power is turned off is outputted to the releasing circuit from the magnetic disk driving control section. However, this power off signal can be directly outputted from the power monitoring circuit to the releasing circuit.

In the above-mentioned embodiment, the present invention is applied to the magnetic disk device of the medium exchanging type, but can be similarly applied to a disk device of a type except for this medium exchanging type.

As mentioned above, in accordance with the present invention, an ejection inhibiting mechanism in a disk memory device of a medium exchanging type comprises a latching solenoid for inhibiting the operation of an ejecting mechanism for ejecting a memory medium; inhibit releasing means for releasing the inhibition of the operation of the ejecting mechanism by the operation of the latching solenoid when a predetermined time has passed after power of the disk memory device is stopped; and a storage battery charged at any time and supplying power to the latching solenoid and the inhibit releasing means. Accordingly, power is supplied by the storage battery to the latching solenoid and the inhibit releasing means even when the power of the disk device is stopped. Therefore, it is possible to inhibit the operation of the ejecting mechanism while the rotation of a memory medium is stopped. Thus, it is possible to prevent the memory medium and the recording/reproducing head from being damaged.

Many widely different embodiments of the present invention may be constructed without departing from the spirit and scope of the present invention. It should be understood that the present invention is not limited to the specific embodiments described in the specification, except as defined in the appended claims.

What is claimed is:

1. An ejecting mechanism in a disk memory device of a memory medium exchanging type, comprising:

a loading means for loading a disk cartridge housing a magnetic disk and for carrying the disk cartridge onto a driving means driving the disk cartridge;

an ejecting means engaging with the loading means for actuating the loading means so as to eject the disk cartridge;

a latching solenoid for selectively engaging with the loading means for inhibiting the ejecting of the disk cartridge, said latching solenoid being held in one of respective states of attracting and releasing respectively corresponding to the direction of current supplied to the latching solenoid;

an electrical storage means being adapted to be charged with electric power while the disk memory device is powered on; and an inhibit releasing means for releasing the inhibiting of the ejecting of the disk cartridge connected with the latching solenoid and electrical storage means for causing the electrical storage means to supply the latching solenoid with electric power after the disk memory device is powered off and the magnetic disk stops rotating, said ejecting means ejecting said disk cartridge after inhibiting is released by said inhibit releasing means.

2. An ejecting mechanism according to claim 1, wherein the latching solenoid is adapted to inhibit the ejecting of the disk cartridge when the latching solenoid is held in said attracting state.

3. An ejecting mechanism according to claim 1, wherein the releasing means includes a timer circuit.

* * * * *